United States Patent [19]

Valencia et al.

[11] Patent Number: 5,265,428

[45] Date of Patent: Nov. 30, 1993

[54] BUBBLE CAP TRAY FOR MELTING SOLIDS AND METHOD FOR USING SAME

[75] Inventors: Jaime A. Valencia, Houston, Tex.; Donald J. Victory, New Orleans, La.

[73] Assignee: Exxon Production Research Company, Houston, Tex.

[21] Appl. No.: 593,701

[22] Filed: Oct. 5, 1990

[51] Int. Cl.$^5$ .................................................. F25J 3/00
[52] U.S. Cl. ................................................... 62/36; 62/42
[58] Field of Search ............................... 62/32, 36, 42

[56] References Cited

U.S. PATENT DOCUMENTS

| | | | |
|---|---|---|---|
| 1,510,178 | 9/1924 | Lachmann | 62/42 |
| 2,502,251 | 3/1950 | Dennis | 62/42 |
| 2,650,480 | 9/1953 | Gilmore | 62/42 |
| 2,804,292 | 8/1957 | Schilling | 62/32 |
| 2,930,201 | 3/1960 | Karwat | 62/32 |
| 2,946,200 | 7/1960 | Schilling | 62/32 |
| 4,533,372 | 8/1985 | Valencia et al. | 62/12 |
| 4,579,566 | 4/1986 | Brugerolle | 62/42 |
| 4,923,493 | 5/1990 | Valencia et al. | 62/13 |

Primary Examiner—Ronald C. Capossela
Attorney, Agent, or Firm—J. R. Casperson

[57] ABSTRACT

An elongated bubble cap tray allows three phases: solid, vapor and liquid, to come in contact at the bottom of a controlled freezing zone and transfer heat and mass amongst themselves. Complete melting of the solid phase may be achieved in this tray, significantly reducing or totally eliminating the need for an external source of energy as well as its associated heat transfer equipment.

1 Claim, 3 Drawing Sheets

BUBBLE CAP TRAY FOR MELTING SOLIDS AND METHOD FOR USING SAME

FIELD OF THE INVENTION

This invention relates to a distillation process and apparatus.

BACKGROUND OF THE INVENTION

U.S. Pat. No. 4,533,372 to Jaime A. Valencia and Robert D. Denton discloses a method and apparatus for separating carbon dioxide and other acid gases from methane by treating a feedstream in a controlled freezing zone. Such treatment is referred to as the "CFZ Process". The CFZ Process provides for the solidification of carbon dioxide in a distillation tower in a controlled manner and permits the thermodynamic separation by distillation of a feedstream mixture containing carbon dioxide and methane in a single distillation column. The present invention can be used to provide improved heat transfer in the CFZ Process.

SUMMARY OF THE INVENTION

Briefly, the invention includes a bubble cap tray having elongated caps. The elongated caps enable the formation of a sufficiently deep heat reservoir on the tray to be capable of melting any solids such as solid $CO_2$ formed above the tray that fall into it and provide stable unit operations. The warm vapors from beneath the tray flow up the risers and down between risers on the tray and the elongated caps and are released at the open end of the caps, near the bottom of the liquid layer on the tray. The warm vapor transfers heat to the liquid, and in turn to the solid carbon dioxide. The depth of the liquid layer provides a sufficiently long contact time of warm vapors, liquid, and solids to insure at least the substantial melting of the solids prior to the resultant liquid being discharged from the tray to the lower distillation section of the column. The tray also provides excellent mass transfer between all three phases present: vapor, liquid and solid.

DESCRIPTION OF THE PREFERRED EMBODIMENT

Prior to U.S. Pat. No. 4,533,372 to Valencia et al., the phenomenon of carbon dioxide solids formation was considered a problem in performing the cryogenic distillation of carbon dioxide and methane. This phenomenon is thermodynamically illustrated in FIG. 1. This diagram is based on data from H. G. Donnelly, and D. L. Katz, Ind. Eng. Chem. 46, 511 (1954). The diagram shows regions for the various phases of carbon dioxide: liquid only, vapor only, vapor and liquid existing together, and regions having solids existing with either vapor or liquid.

Figure 1:
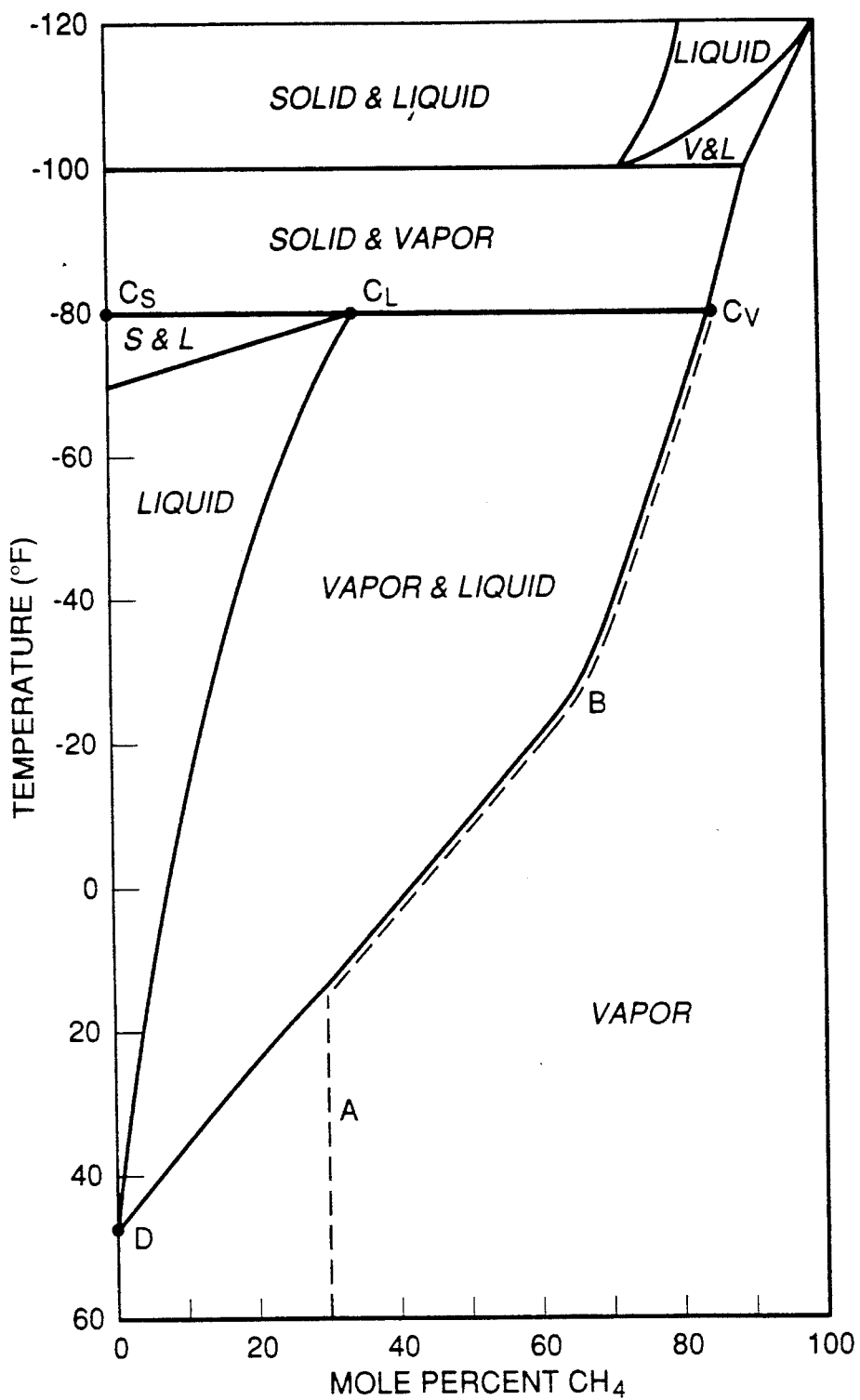
FIG. 1 is a phase diagram of carbon dioxide and methane at 650 psia.

FIG. 1 illustrates that the formation of carbon dioxide solids would be expected if separation of a carbon dioxide-methane mixture is attempted at 650 psia. For example, cooling a 30% methane/70% carbon dioxide mixture initially at 60° F., along line "A" in FIG. 1 will cause liquid to form beginning at about 15° F. At this point, vapor-liquid equilibrium distillation may take place. The vapor in equilibrium with the liquid would increase in methane content along line "B". As the temperature is lowered to about −80° F., solid carbon dioxide would begin to form. At these conditions, three phases coexist along line "C": solid, point "$C_s$"; liquid, point "$C_l$"; and vapor, point "$C_v$". Thus conventional vapor-liquid distillation could take place in the "Vapor-Liquid" region limited by the solidification line "C" and by pure CO2, point "D". However, at temperatures colder than −80° F., the formation of solid carbon dioxide would render conventional distillation tower internals inoperable. Therefore at 650 psia, the product methane stream in the illustration would have as much as 15% carbon dioxide remaining in it.

Figure 2:
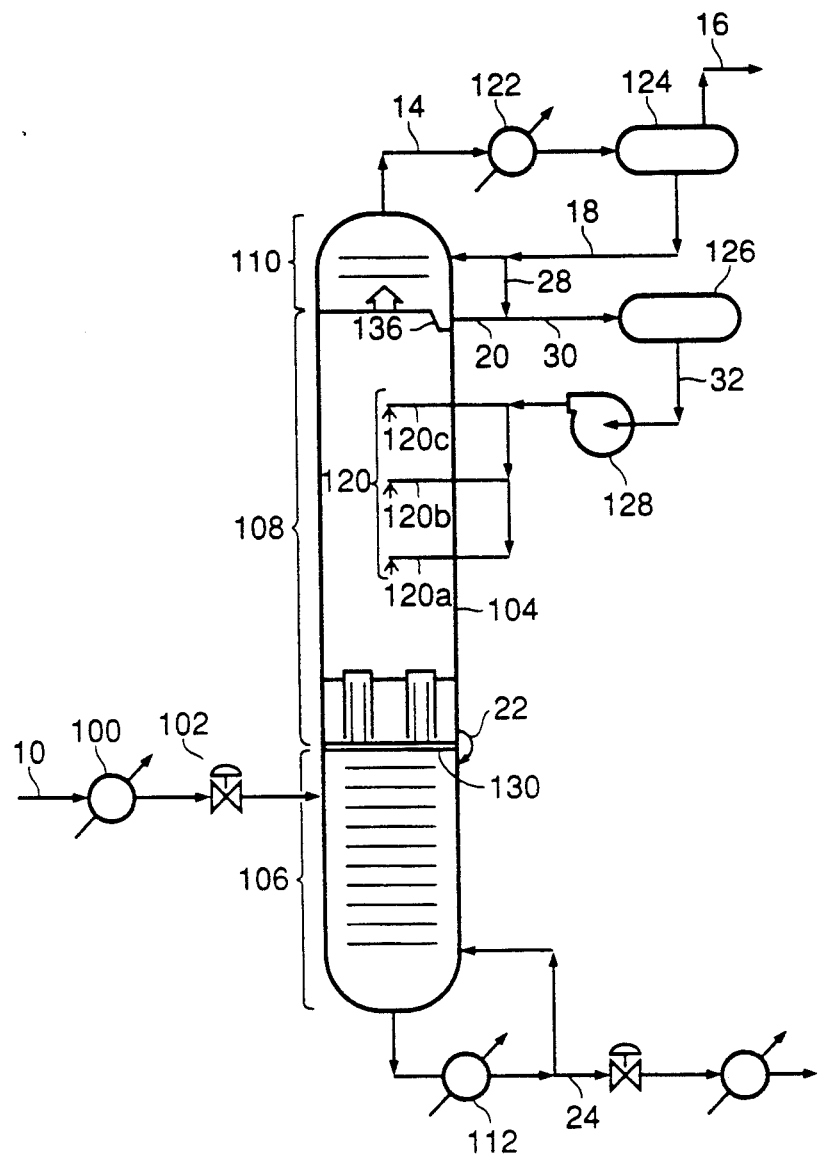
FIG. 2 illustrates, in schematic fashion, a process of separating carbon dioxide from methane using the CFZ Process.

FIG. 2 illustrates, in schematic fashion, the concept of separating carbon dioxide from methane using the CFZ Process. Table I is an approximate material balance for one such application showing operating conditions at various points enumerated in FIG. 2. Table II shows an approximate characterization of the distillation tower 104. In a typical application, a dried gas stream from a wellhead containing methane, carbon dioxide and other components such as nitrogen, hydrogen sulfide, and other hydrocarbons, is introduced into the unit through line 10.

This feed stream may be first cooled in indirect heat exchanger 100 and then expanded through a turbine expander or a Joule-Thompson ("J-T") valve 102 as shown in FIG. 2. The function of pre-cooler 100 and J-T valve 102 is to drop the temperature to a level suitable for introduction of this stream into the methane-carbon dioxide distillation tower 104.

As shown in this diagram, the distillation tower 104 is separated into three sections: a lower distillation section 106, a middle controlled freezing zone 108, and an upper distillation section 110. However, the upper distillation section 110 can be located in a separate column or eliminated altogether depending on product purity requirements. The internals of upper section 110 and lower section 106 may include equipment suitable for vapor liquid distillation such as trays, random or structured packing, downcomers, and weirs, or other conventional equipment if desired. The tower feed, as mentioned above, is introduced into the lower distillation section 106 through line 10 where it undergoes typical distillation. Liquid carbon dioxide product leaving the bottom of the section is heated in reboiler 112 and a portion is returned to the tower as reboiled liquid. The remainder leaves the process as a product via line 24.

The lighter vapors leave distillation section 106 and enter the controlled freezing zone 108 via a bubble cap tray 130 having elongated caps. After bubbling through the liquid in the elongated bubble cap tray, at the bottom of zone 108, the rising vapors contact liquid spray (sprayed freezing zone liquid feedstream which as used here may also be referred to as spray liquid) emanating from nozzles or spray jet assemblies 120. The vapor then continues up through the upper distillation section 110. Reflux is introduced to the tower through lines 18 and if desired through 28. Vapor leaving tower 104 through line 14 can be partially condensed in reflux condenser 122 and separated into liquid and vapor phases in reflux drum 124. Liquid from reflux drum 124 can be returned to the tower via line 18. The vapor from the drum can be taken off as a product in line 16 for subsequent sale to a pipeline or condensation as LNG.

The liquid produced in upper distillation section 110' can be collected and withdrawn from the tower via line 20. Liquid in line 20 may be accumulated in vessel 126 and returned to the controlled freezing zone using pump 128 and spray nozzles 120. The vapor rising through bubble cap tray 130 meets the spray liquid emanating from nozzles 120. Solid carbon dioxide forms and falls to the bottom of controlled freezing zone 108, where a level of liquid is maintained on the tray 130.

Optimal operation of the CFZ Process requires that all the solids falling on the CFZ tray 130 be melted at the bottom of the controlled freeze zone 108 and that only a liquid phase stream 22 be passed from the controlled freeze zone 108 to the lower distillation zone 106.

Figure 3:
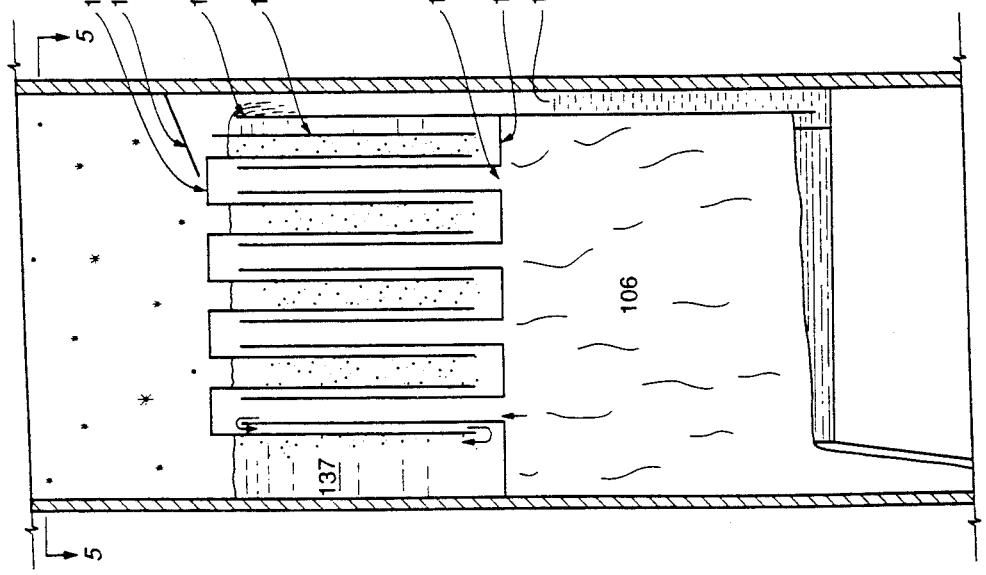
FIG. 3 illustrates in a simplified manner, an elongated bubble cap tray according to one embodiment of the invention.

FIG. 3 illustrates the operation of the bubble cap tray having elongated caps. Warm vapors from the lower distillation zone 106 rise through the vapor feed risers 134, then flow downward through the annular space between the vapor feed risers 134 and the caps 136, and are discharged near the bottom of the liquid layer 137 adjacent the upper surface of the tray base. The skirt of the cap is preferably nearly the same as the length of the riser. The invention can be carried out with only one riser if desired, but better results will be obtained when a plurality of risers are used. The risers will generally have a length in the range of about 0.5 to about 10 feet, usually in the range of about 1 to about 5 feet corresponding with the liquid depth on the tray. The risers in a preferred embodiment can have a length to inside diameter ratio in the range of about 2:1 to about 20:1, usually in the range of about 3:1 to about 10:1, although the invention can be carried out with risers not so constructed.

As the vapor rises through the liquid layer on the tray, it intimately and turbulently contacts the liquid and Solids mixture pooled on the tray and transfers heat to the liquid. The heat from the liquid layer is transferred in turn to the falling crystals of solid carbon dioxide, thus melting them. The turbulence in the liquid created by the rising vapor also facilitates the transfer of heat to the solids. The bubble cap tray having elongated caps allows the efficient melting of the solids formed in the CFZ section, significantly reducing and if desired, eliminating the need of all external heat source to melt the solids.

In addition, mass transfer also takes place between the liquid, vapor and solids present. Much like in conventional distillation, the light, more volatile component in the liquid phase, in this case methane, vaporizes to enrich the vapor above the tray in methane. Likewise, the heavier component, in this case carbon dioxide, condenses out of the vapor and enriches the liquid in carbon dioxide. The degree of separation effected in the bubble cap tray is further enhanced by the melting of pure carbon dioxide crystals. This results in a liquid stream highly enriched in carbon dioxide, much more so than if only vapor-liquid distillation were to take place without the heretofore troublesome formation of solid carbon dioxide.

The vertically elongated configuration of the tray enables a sufficient depth of liquid to be easily maintained. A sufficient depth is needed to provide enough contact time between the three phases for heat and mass transfer to take place. In one simple embodiment, liquid level is controlled by use of a downcomer having an inlet in the CFZ section and an outlet in the lower distillation section. Liquid level control can be accomplished by flowing over weir 138 and down downcomer 139 as shown in FIG. 3. However, more sophisticated, adjustable liquid level control methods, using level sensors, control valves and/or pumps can also be used. Optimal results would be anticipated by maintaining the liquid level in the proximity of the upper surface of the caps.

Figure 5:
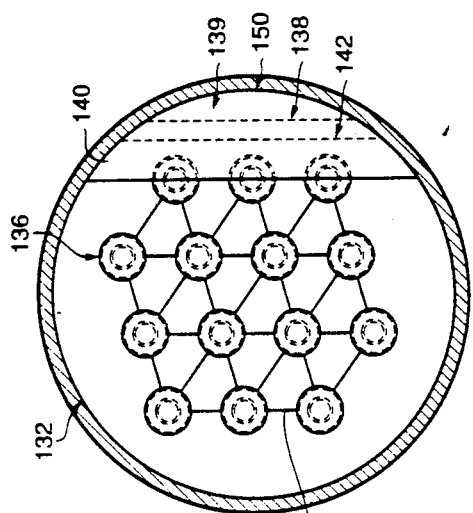
FIG. 5 is a top view of an elongated bubble cap tray according to one embodiment of the invention as viewed along line 5—5 of FIG. 3.

In the example configuration of FIG. 3 the downcomer entry is positioned near the periphery of the bubble cap tray. As shown in FIG. 5, the downcomer 139 entry can be defined between the weir 138 and the inside wall of the distillation column 150. The apparatus is provided with a deflecting cover or roof 140 to prevent solids from falling into the downcomer. A baffle 142 prevents solids which fall past the roof edge or too near the downcomer entrance from bypassing across the liquid surface and entering the downcomer.

The deflecting cover 140 and baffle 142 are not completely sealed to each other. A passage is left to provide for equalization of pressure of vapors above and below the cover 140. In a preferred embodiment, a slot is formed between the upper rim of the baffle and the lower lip of the roof for any vapor flow needed for pressure equalization. The opening to the downcomer is positioned under the eave of the roof. The baffle is positioned under the eave of the roof between the opening of the downcomer and the elongated caps and is formed by a wall structure oriented generally normally to the tray structure and spaced apart therefrom, so that liquid can flow under the baffle and upwardly over the top of the weir and into the downcomer opening. In a preferred embodiment, a slot is formed between a lower lip of the baffle and an upper surface of the tray. As is known to those skilled in the art, multiple liquid outlets, or multiple downcomers or a different location for the downcomer can be used to improve flow patterns, particularly in large towers.

The downcomer provides a means for transferring liquid from the CFZ section to the lower distillation section. A sufficient leg of liquid is maintained in the downcomer as a liquid seal to prevent vapors from flowing from the lower distillation section to the CFZ section effectively bypassing the elongated bubble cap tray. Other means can also be used to transfer liquid from the CFZ section to the lower distillation section such as an external line with a liquid level control valve.

Figure 4:
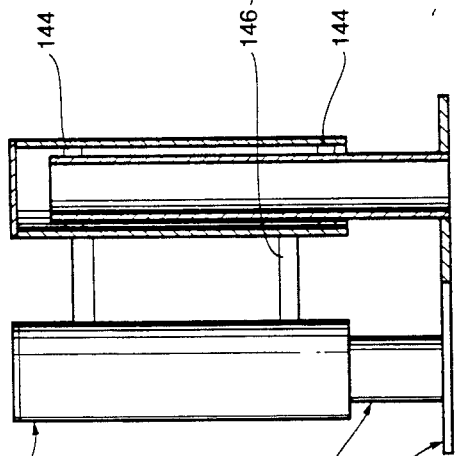
FIG. 4 is a side view of a portion of an elongated bubble cap tray according one embodiment of the invention.

FIGS. 4 and 5 illustrate a typical mechanical configuration for the bubble cap tray having elongated caps. The risers 134 are attached to the tray base plate 132 by welding, screwing or any other suitable means. The caps in turn are attached, in the illustration, to the risers via connecting posts 144 and to each other via connecting posts 146. Other arrangements can be employed if desired, such as attaching the caps 136 to the tray base plate 132 via support posts that are designed so as not to interfere with the vapor flow out of the caps.

The height of the elongated bubble caps and risers is to be tailored to specific applications. In general they should be no less than 6 inches and no larger than 10 ft. preferably between about 1 ft. and about 5 ft. The diameter of the caps should be such as to provide an annular cross sectional area for vapor flow approximately equal to the riser cross sectional area for vapor flow. In turn the diameter of the risers and the number of sets of risers is to be determined for each specific application so as to provide liquid residence times in the 10 seconds to 10 minutes range, preferably in the about ½ to about 5 minutes range given the above liquid depth guidelines. The riser diameter and number of riser/cap sets should also be consistent with generally accepted guidelines in the art for vapor flow passages of 5 to 25% of the tray area.

We claim:

1. A distillation column having an upper distillation section, a lower distillation section, a bubble cap tray separating lower distillation section from the upper distillation section, wherein the tray is formed from a tray base, a plurality of risers and a plurality of bubble caps covering said risers, one cap per riser, a downcomer having an inlet in the upper distillation section and an outlet in the lower distillation section, wherein the downcomer is positioned near the outer periphery of the bubble cap tray, a roof positioned spaced apart from the downcomer inlet and in covering relationship therewith, and a baffle positioned between the bubble caps on the tray and the downcomer inlet, wherein the baffle is positioned under the eave of the roof and is spaced apart from the tray with a passage being formed between the baffle and the roof for vapor pressure equalization and a slot being formed between the tray and the baffle for liquid flow.

* * * * *